(12) United States Patent
Greenhalgh et al.

(10) Patent No.: US 9,559,373 B2
(45) Date of Patent: Jan. 31, 2017

(54) FORMATION OF HYDROPHILIC POLYMER MEMBRANES USING A BRONSTED BASE

(71) Applicant: ITM Power (Research) Limited, Sheffield, South Yorkshire (GB)

(72) Inventors: Daniel Greenhalgh, Sheffield (GB); Rachel Lister, Sheffield (GB)

(73) Assignee: ITM POWER (RESEARCH) LIMITED, South Yorkshire (GB)

(*) Notice: Subject to any disclaimer, the term of this patent is extended or adjusted under 35 U.S.C. 154(b) by 95 days.

(21) Appl. No.: 14/292,315

(22) Filed: May 30, 2014

(65) Prior Publication Data
US 2014/0357739 A1    Dec. 4, 2014

(30) Foreign Application Priority Data
May 31, 2013   (GB) ................... 1309805.8

(51) Int. Cl.
| | |
|---|---|
| *H01M 8/1072* | (2016.01) |
| *H01M 8/10* | (2016.01) |
| *C25B 13/08* | (2006.01) |
| *C25B 9/10* | (2006.01) |

(52) U.S. Cl.
CPC ............. *H01M 8/1072* (2013.01); *C25B 9/10* (2013.01); *C25B 13/08* (2013.01); *H01M 8/1023* (2013.01); *H01M 2008/1095* (2013.01); *Y02E 60/366* (2013.01); *Y02E 60/521* (2013.01); *Y02P 70/56* (2015.11)

(58) Field of Classification Search
USPC .............................................. 521/27; 429/30
See application file for complete search history.

(56) References Cited

U.S. PATENT DOCUMENTS

| | | | | |
|---|---|---|---|---|
| 4,140,680 | A * | 2/1979 | Sullivan ............... | C08F 220/58 526/287 |
| 2003/0113603 | A1* | 6/2003 | Highgate ........... | B01D 67/0006 429/483 |
| 2011/0011748 | A1 | 1/2011 | Highgate | |
| 2014/0130416 | A1* | 5/2014 | Bara ..................... | B01D 53/22 48/127.7 |
| 2015/0175727 | A1* | 6/2015 | Lambert ............... | C08F 212/32 524/553 |
| 2015/0368502 | A1* | 12/2015 | Badyal ................. | C09D 139/04 427/488 |

FOREIGN PATENT DOCUMENTS

| | | | |
|---|---|---|---|
| WO | WO-2012/164313 A1 * | 12/2012 | |
| WO | WO 2012/164313 A1 | 12/2012 | |

* cited by examiner

*Primary Examiner* — Peter D Mulcahy
*Assistant Examiner* — Henry Hu
(74) *Attorney, Agent, or Firm* — Saliwanchik, Lloyd & Eisenschenk

(57) ABSTRACT

A method of forming a hydrophilic polymer is disclosed. The method can include: reacting a monomer comprising an acid group with a Bronsted base to form an ionic liquid; polymerizing the ionic liquid with at least one other monomer; and converting the ionic liquid back to the acid group after polymerization. Also disclosed are hydrophilic polymers and membrane electrode assemblies formed using the above method.

18 Claims, 3 Drawing Sheets

FORMATION OF HYDROPHILIC POLYMER MEMBRANES USING A BRONSTED BASE

CROSS-REFERENCE TO A RELATED APPLICATION

This application claims priority to Great Britain Application No. 1309805.8, filed May 31, 2013; which is incorporated herein by reference in its entirety.

FIELD OF THE INVENTION

The present invention relates to polymer membranes, for use in electrochemical cells.

BACKGROUND OF THE INVENTION

WO03/023890 describes hydrophilic polymer membranes with excellent electrical and hydration properties. They are suitable for use in electrochemical cells. The membranes described in this publication are formed by homogeneous polymerisation, and the presence of water in the polymerisation mixture is necessary in order for the polymer to be formed. This is necessary for the formation of a homogenous polymer with excellent properties.

SUMMARY OF THE INVENTION

WO03/023890, which is incorporated herein by reference in its entirety, describes hydrophilic polymer membranes with excellent electrical and hydration properties.

It was surprisingly found that water is not necessary for the formation of hydrophilic polymers of the type described above, if a Bronsted base is added to the polymerisation mixture. It was also surprisingly found that this results in a super-conductive membrane, which is advantageous in an electrochemical cell.

According to a first aspect, a method of forming a hydrophilic polymer, comprises:
reacting a monomer comprising an acid group with a Bronsted base to form an ionic liquid;
polymerising the ionic liquid with at least one other monomer; and
converting the ionic liquid back to the acid group after polymerisation.

According to a second aspect, hydrophilic polymers are formed using the above method.

According to a third aspect, a membrane electrode assembly comprises a polymer as described above.

According to a fourth aspect, a fuel cell or an electrolyser comprises a membrane electrode assembly as defined above.

DESCRIPTION OF THE PREFERRED EMBODIMENTS

Figure 1:
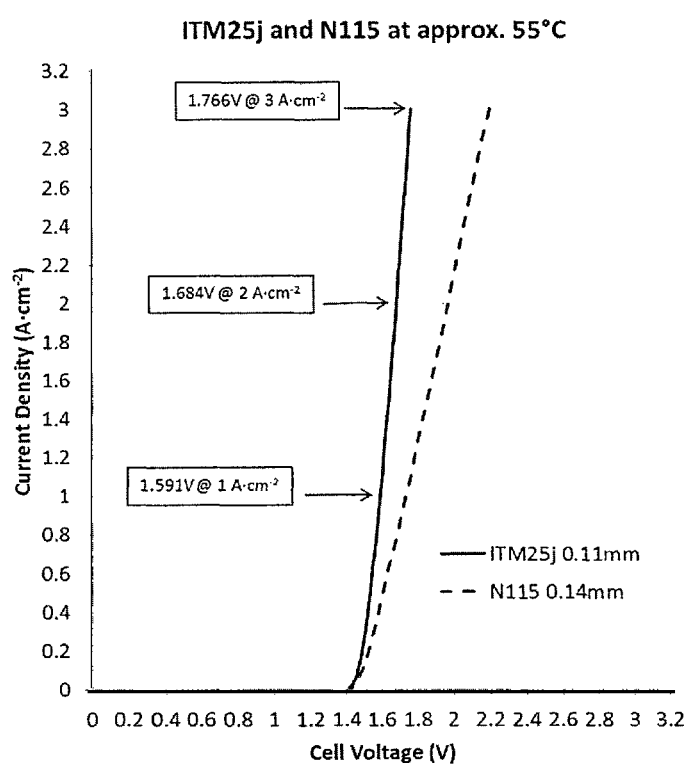
FIG. 1 shows a plot of current density versus voltage.

As used herein, the term hydrophilic polymer has the standard meaning in the art. It is understood by a person skilled in the art of polymer chemistry, to mean "a polymer which dissolves in water". To make them useful in industry, hydrophilic polymers are commonly cross-linked, which renders them insoluble. A cross-linked hydrophilic polymer is not soluble in water (but it has an affinity for water), but if those cross-links were removed, the polymer would dissolve in water. Nafion®, for example, is not a hydrophilic polymer.

As used herein, a Bronsted base is a species with the ability to accept a proton ($H^+$).

In a preferred embodiment, the Bronsted base used in the present invention is methylimidazole (preferably 1-methylimidazole), triethylamine, Tris[2-(2-methoxyethoxy)ethyl] amine, 1-ethylimidazole or 1-butylimidazole. In a more preferred embodiment, the Bronsted base is methylimidazole, more preferably 1-methylimidazole. This base is particular advantageous and forms particularly conductive membranes.

Preferably, the acid group is a sulphonic acid group. More preferably, the monomer including the acid group is 2-acrylamido-2-methyl-1-propanesulphonic acid (AMPSA), vinylsulphonic acid (VSA), styrenesulphonic acid (SSA), 2-sulphoethyl methacrylate (SEM) or 3-sulphopropyl methacrylate, Na salt (SPM). AMPSA is preferred.

In addition to the monomer with the acid group, the components to be polymerised comprise another monomer. Preferably, the components to be polymerised comprise at least two other monomers, or at least three or at least 4 (or 2, 3 or 4).

Preferably, the at least one other monomer includes a hydrophobic monomer, preferably selected from methyl methacrylate (MMA), acrylonitrile (AN), methacryloxypropyltris (trimethylsiloxy) silane (TRIS), 2,2, 2-trifluoroethyl methacrylate (TRIF) and styrene (STY).

Preferably, the at least one other monomer includes a hydrophilic monomer, preferably selected from methacrylic acid (MA), 2-hydroxyethyl methacrylate (HEMA), ethyl acrylate (EA), 1-vinyl-2-pyrrolidinone (VP), propenoic acid 2-methyl ester (PAM), monomethacryloyloxyethyl phthalate (EMP), ammonium sulphatoethyl methacrylate (SEM).

In a preferred embodiment, the components to be polymerised comprise both a hydrophilic and a hydrophobic monomer (or more than one of each).

Preferably, the components to be polymerised comprises a cross-linker, which is preferably divinylbenzene (DVB). This results in a cross-linked polymer.

Preferably, the components to be polymerised comprise vinylphosphonic acid.

In a preferred embodiment, the polymerisation is UV polymerisation. Gamma and Thermal polymerisation are further examples of methods suitable for use in the invention.

Without wishing to be bound by theory, it is believed that the reaction of the Bronsted base with the strong acid group in the monomer, forms an ionic liquid, which is miscible with the other monomer component, and allows for the formation of a homogeneous polymer, without the use of water. This is particularly useful in membrane electrode assemblies. Although the use of water is not precluded in the present invention, in one embodiment, the components to be polymerised preferably do not comprise water.

Again, without wishing to be bound by theory, it is believed that the presence of the Bronsted base in a method of the invention causes a structural change in the hydrophilic polymer that is formed, compared to a membrane formed without the Bronsted base. This may be responsible for the super-conductive properties. Converting the acid, for example AMPSA, to the ionic liquid form improves miscibility with other monomers, in particular hydrophobic monomers. It is possible that the use of a large counterion during polymerisation leads to changes in the structure of the polymer, creating more open channels for ion conduction. In a preferred embodiment, water is absence in the polymerisation method of the invention. It is believed that the absence of water will also affect the polymerisation, leading to structural differences.

All patents, patent applications, provisional applications, and publications referred to or cited herein are incorporated by reference in their entirety, including all figures and tables, to the extent they are not inconsistent with the explicit teachings of this specification.

The following Examples illustrate the invention.

EXAMPLE 1

A membrane was produced with the components listed in the table below:

| Polymer 1 | % by mass in final polymer |
|-----------|---------------------------|
| AN | Around 50 |
| STY | Around 10 |
| AMPSA | Around 30 |
| MI | 0.1-1 |
| DVB | 0.1-5 |
| Benzoin | 0.1-5 |

The methylimidazole was removed by ion exchange and the resulting membrane was highly conductive.

EXAMPLE 2

A membrane was formed with the following components:
Acrylonitrile
2-Hydroxyethylmethacrylate
2-Acrylamido-2-methyl-1-propanesulfonic acid
Vinylphosphonic acid
Divinylbenzene
1-Methylimidazole
Water
2-Hydroxy-2-methyl propiophenone The methylimidazole was removed by ion exchange and the resulting membrane was highly conductive.

EXAMPLE 3

55.1 g Acrylonitrile (AN) was weighed into a reaction vessel. 35.0 g 2-acrylamido-2-methylpropanesulfonic acid (AMPSA) was added to this together with 13.9 g 1-methylimidazole (MI). The mixture was stirred until all the AMPSA was dissolved. 10.34 g Styrene (STY), 2.0 g divinylbenzene (DVB) and 1.0 g benzoin (B) were added to the reaction vessel and the mixture was stirred until homogeneous.

6 ml of the mixture was sealed in a plastic mould and cured under UV irradiation for 900 s. The resulting membrane was washed with water then ion exchanged in 1 M $H_2SO_4$ to remove the methylimidazole and convert the membrane to the acid form.

The membrane was named ITM25j and the I/V curve is shown in FIG. 1. The I/V curve for Nafion® 115 is also given as a comparison. The results show that ITM25j is much more conductive than Nafion® 115.

Figure 2:
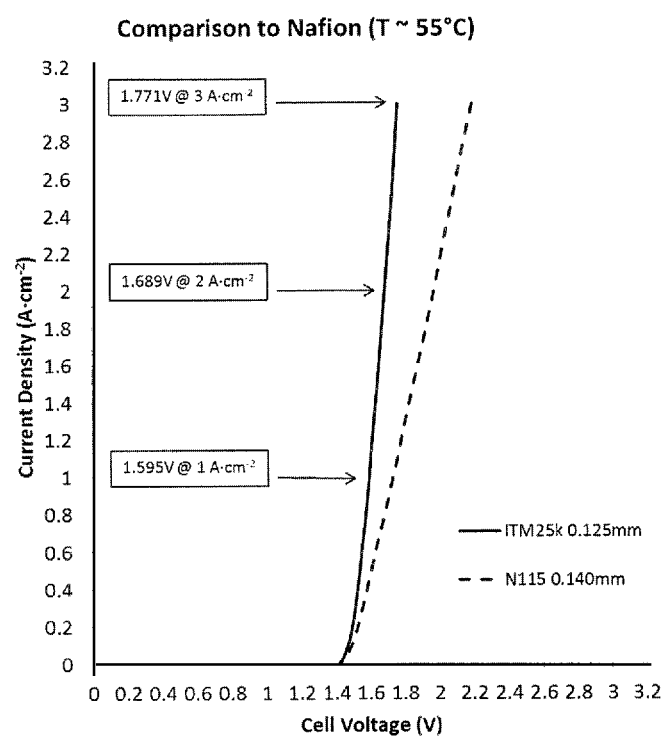
FIG. 2 shows a plot of current density versus voltage.

The Example was repeated adding vinylphosphonic acid to the monomer mixture. This membrane was named ITM25k and the IN curve is shown in FIG. 2. The I/V curve for Nafion® 115 is also given as a comparison. The results show that ITM25k is much more conductive than Nafion® 115.

The through-plane conductivity of ITM25k was measured by Electrochemical Impedance Spectroscopy. The membrane has a value of 262 mS·cm$^{-1}$ at 52° C. measured in-situ in a water electrolyser.

Figure 3:
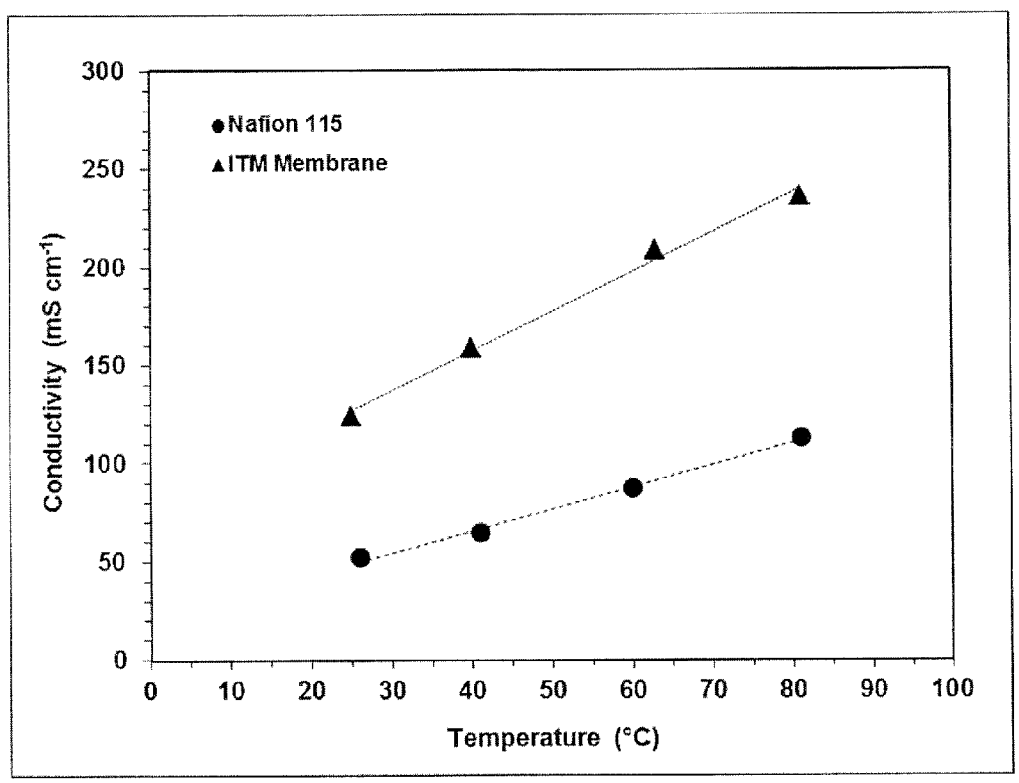
FIG. 3 shows a plot of conductivity versus temperature.

The conductivity as a function of temperature was recorded for the ITM25j and the results are shown in FIG. 3.

We claim:

1. A method of forming a hydrophilic polymer, comprising:
   reacting a monomer comprising an acid group with a Bronsted base to form an ionic liquid;
   polymerising the formed ionic liquid with at least one other monomer; and
   converting the polymerised ionic liquid back to the acid group, after polymerisation, by removal of the Bronsted base.

2. The method according to claim 1, wherein the Bronsted base is methylimidazole, triethylamine, Tris[2-(2-methoxyethoxy)ethyl]amine, 1-ethylimidazole or 1-butylimidazole.

3. The method according to claim 2, wherein the Bronsted base is methylimidazole.

4. The method according to claim 3, wherein the Bronsted base is 1-methylimidazole.

5. The method according to claim 1, wherein the acid group is a sulphonic acid group.

6. The method according to claim 1, wherein the monomer comprising the acid group is 2-acrylamido-2-methyl-1-propanesulphonic acid (AMPSA), vinyl sulphonic acid (VSA), styrenesulphonic acid (SSA), 2-sulphoethyl methacrylate (SEM) or 3-sulphopropyl methacrylate, Na salt (SPM).

7. The method according to claim 1, wherein the at least one other monomer includes a hydrophobic monomer.

8. The method according to claim 7, wherein the hydrophobic monomer is selected from methyl methacrylate (MMA), acrylonitrile (AN), methacryloxypropyltris (trimethylsiloxy) silane (TRIS), 2,2,2-trifluoroethyl methacrylate (TRIF) and styrene (STY).

9. The method according to claim 1, wherein the at least one other monomer includes a hydrophilic monomer.

10. The method according to claim 9, wherein the hydrophilic monomer is selected from methacrylic acid (MA), 2-hydroxyethyl methacrylate (HEMA), ethyl acrylate (EA), 1-vinyl-2-pyrrolidinone (VP), propenoic acid 2-methyl ester (PAM), monomethacryloyloxyethyl phthalate (EMP) and ammonium sulphatoethyl methacrylate (SEM).

11. The method according to claim 1, wherein the components to be polymerised are dissolved in water.

12. The method according to claim 1, wherein the polymerisation is non-aqueous.

13. The method according to claim 1, wherein the components to be polymerised comprise a cross-linker, such that a cross-linked hydrophilic polymer is formed.

14. The method according to claim 13, wherein the cross-linker is divinylbenzene (DVB).

15. The method according to claim 1, wherein the at least one other monomer comprises vinylphosphonic acid.

16. The method according to claim 1, wherein the ionic liquid is converted back to the acid group by ion-exchange after polymerisation.

17. The method according to claim 16, wherein the ionic liquid is converted back to the acid group by ion-exchange using sulphuric acid after polymerisation.

18. A hydrophilic polymer formed from the method according to claim 1.

* * * * *